United States Patent
Park et al.

(10) Patent No.: US 9,974,022 B2
(45) Date of Patent: May 15, 2018

(54) METHOD AND APPARATUS FOR POWER SAVING MODE-BASED OPERATION IN WIRELESS LAN

(71) Applicant: LG ELECTRONICS INC., Seoul (KR)

(72) Inventors: Giwon Park, Seoul (KR); Kiseon Ryu, Seoul (KR); Jeongki Kim, Seoul (KR); Hangyu Cho, Seoul (KR); Suhwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/309,415

(22) PCT Filed: Apr. 3, 2015

(86) PCT No.: PCT/KR2015/003389
§ 371 (c)(1),
(2) Date: Nov. 7, 2016

(87) PCT Pub. No.: WO2015/170831
PCT Pub. Date: Nov. 12, 2015

(65) Prior Publication Data
US 2017/0195959 A1    Jul. 6, 2017

Related U.S. Application Data

(60) Provisional application No. 61/990,112, filed on May 8, 2014.

(51) Int. Cl.
*H04W 52/02*    (2009.01)
*H04W 84/12*    (2009.01)

(52) U.S. Cl.
CPC ........ *H04W 52/0225* (2013.01); *H04W 84/12* (2013.01)

(58) Field of Classification Search
USPC ........................................................ 370/311
See application file for complete search history.

(56) References Cited

U.S. PATENT DOCUMENTS 7,519,017 B2    4/2009    Yi
7,697,561 B2 *  4/2010    Nishibayashi ........ H04L 1/1614
                                                         370/392

(Continued)

FOREIGN PATENT DOCUMENTS

JP        2012095032       5/2012
KR    1020050024760 A      3/2005

(Continued)

OTHER PUBLICATIONS

NPL "802.11-2012, Part 11: Wireless LAN Medium Access Control (MAC) and Physical Layer (PHY) Specification, dated Mar. 29, 2012, by IEEE Computer Society".*

(Continued)

*Primary Examiner* — Gregory Sefcheck
*Assistant Examiner* — Majid Esmaeilian
(74) *Attorney, Agent, or Firm* — Lee, Hong, Degerman, Kang & Waimey

(57) ABSTRACT

Disclosed are a method and apparatus for power saving mode-based operation in a wireless LAN. A method for power saving mode-based operation in a wireless LAN can comprise the steps of: an STA performing an initial configuration procedure for configuring a TIM-based power saving mode and an AP; the STA being converted from a doze state to an awake state, on the basis of a transmission period of a beacon frame, by operating in the TIM-based power saving mode on the basis of the initial configuration procedure, and thereby receiving a first downlink frame from the AP; the STA receiving from the AP operation mode configuration information indicating conversion from the TIM-based power saving mode to an active mode; and the (Continued)

STA receiving, on the basis of the active mode, a second downlink frame from the AP.

6 Claims, 16 Drawing Sheets

(56) References Cited

U.S. PATENT DOCUMENTS

| | | | |
|---|---|---|---|
| 8,155,096 B1* | 4/2012 | Proctor, Jr. | H04W 52/42 370/335 |
| 2008/0219228 A1* | 9/2008 | Seok | H04W 52/0225 370/338 |
| 2008/0227427 A1* | 9/2008 | Kadavallur | H04M 1/72536 455/403 |
| 2009/0034498 A1* | 2/2009 | Banerjea | H04W 76/15 370/338 |
| 2010/0278099 A1* | 11/2010 | Lee | H04L 29/06027 370/328 |
| 2012/0287835 A1 | 11/2012 | Jeon et al. | |
| 2013/0070605 A1* | 3/2013 | Ghosh | H04W 72/082 370/241 |
| 2013/0242835 A1 | 9/2013 | Seok | |
| 2013/0329627 A1* | 12/2013 | Liu | H04B 7/15 370/315 |
| 2014/0086131 A1 | 3/2014 | Seok | |
| 2014/0092731 A1 | 4/2014 | Gupta | |

FOREIGN PATENT DOCUMENTS

| | | |
|---|---|---|
| KR | 1020080033760 A | 4/2008 |
| KR | 1020120041197 A | 4/2012 |
| KR | 1020140037892 A | 3/2014 |

OTHER PUBLICATIONS

"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Draft P802.11-REVmb™/D12, Nov. 2011, section 8.3.3.2., pp. 463-467 (6 pages provided).

"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Draft P802.11-REVmb™/D12, Nov. 2011, section 8.5.8.3., pp. 799-800 (3 pages provided).

"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Draft P802.11-REVmb™/D12, Nov. 2011, section 8.3.3.9., pp. 473-474 (3 pages provided).

"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Draft P802.11-REVmb™/D12, Nov. 2011, section 8.3.3.10., pp. 474-477 (5 pages provided).

"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Draft P802.11-REVmb™/D12, Nov. 2011, section 8.3.3.11., pp. 478-479 (3 pages provided).

"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Draft P802.11-REVmb™/D12, Nov. 2011, section 8.3.3.5.-8.3.3.6., pp. 467-468 (3 pages provided).

"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Draft P802.11-REVmb™/D12, Nov. 2011, section 8.4.2.29., pp. 611-615 (6 pages provided).

"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Draft P802.11-REVmb™/D12, Nov. 2011, section 8.2.4.1., pp. 425-429 (6 pages provided).

PCT International Application No. PCT/KR2015/003389, International Search Report dated Jul. 13, 2015, 2 pages.

Japan Patent Office Application Serial No. 2017-511125, Office Action dated Dec. 27, 2017, 3 pages.

\* cited by examiner

FIG. 1
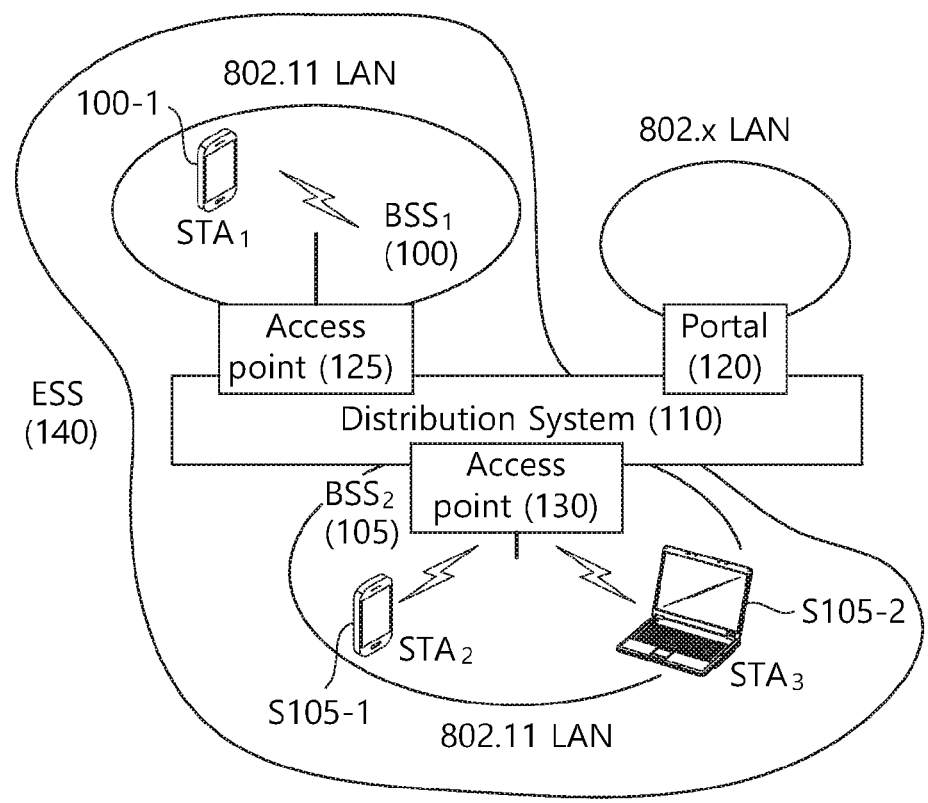
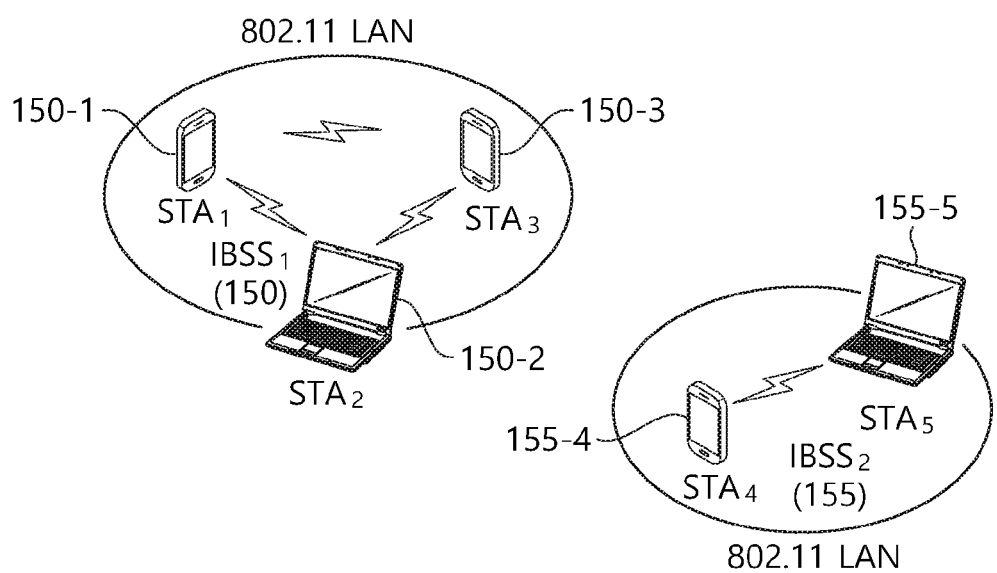

FIG. 8

| 800 | 810 | 820 | 830 | 840 | 850 |
|---|---|---|---|---|---|
| WAN Info | Downlink Speed | Uplink Speed | Downlink Load | Uplink Load | Local Meas. Duration |

WAN metrics

FIG. 9

| STA 1 | STA 2 | STA 3 | STA 4 | STA 5 | STA 6 | STA 7 | STA 8 |
|---|---|---|---|---|---|---|---|
| 1 | 1 | 1 | 1 | 0 | 0 | 0 | 0 |

TIM bitmap (900)

| STA 1 | STA 2 | STA 3 | STA 4 | STA 5 | STA 6 | STA 7 | STA 8 |
|---|---|---|---|---|---|---|---|
| 1 | 1 | 0 | 0 | 1 | 1 | 1 | 1 |

Power management bitmap (920)

FIG. 10

| | STA 1 | STA 2 | STA 3 | STA 4 | STA 5 | STA 6 | STA 7 | STA 8 | |
|---|---|---|---|---|---|---|---|---|---|
| | 0 | 1 | 1 | 1 | 0 | 0 | 0 | 1 | Virtual TIM bitmap (1000) |

| | STA 1 | STA 2 | STA 3 | STA 4 | STA 5 | STA 6 | STA 7 | STA 8 | |
|---|---|---|---|---|---|---|---|---|---|
| | 0 | 0 | 1 | 1 | 0 | 0 | 0 | 0 | Power management bitmap (1020) |

FIG. 14
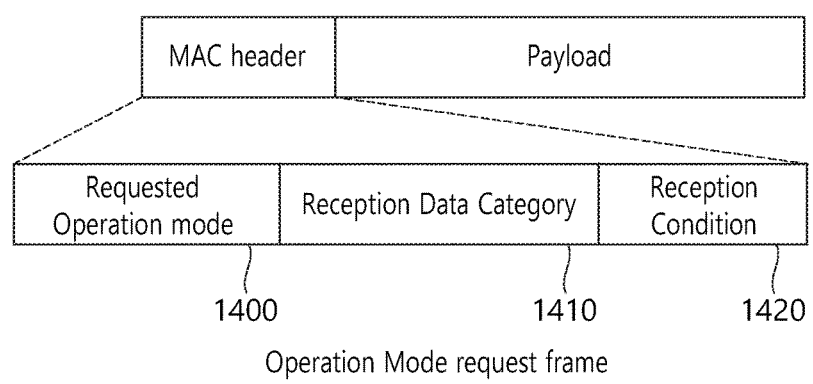
Operation Mode request frame
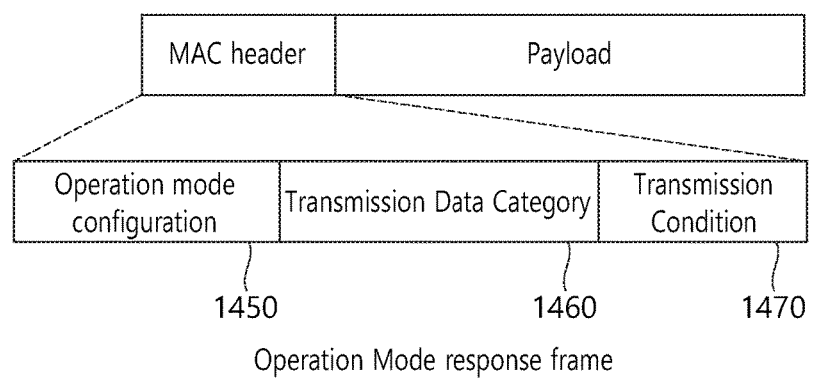
Operation Mode response frame

US 9,974,022 B2

METHOD AND APPARATUS FOR POWER SAVING MODE-BASED OPERATION IN WIRELESS LAN

CROSS-REFERENCE TO RELATED APPLICATIONS

This application is the National Stage filing under 35 U.S.C. 371 of International Application No. PCT/KR2015/003389, filed on Apr. 3, 2015, which claims the benefit of U.S. Provisional Application No. 61/990,112, filed on May 8, 2014, the contents of which are all hereby incorporated by reference herein in their entirety.

BACKGROUND OF THE INVENTION

Field of the Invention

The present invention relates to wireless communication and, most particularly, to a method and apparatus for power saving mode-based operation in a wireless local area network (WLAN).

Related Art

An IEEE 802.11 standard provides a power save mechanism (or power save mode) to increase the lifespan of a wireless local area network (WLAN) station (STA). The STA operating based on the power save mode may operate in an awake state or a doze state for power saving. The awake state is a state which enables a normal operation of the STA such as frame transmission or reception, channel scanning, etc. On the other hand, the doze state is a state in which power consumption is extremely reduced and thus frame transmission or reception and channel scanning are impossible. In a case where the STA usually operates in the power save mode, the STA is in the doze state and, when necessary, transitions to the awake state, thereby reducing power consumption.

If the STA operates for a long time in the doze state, power consumption of the STA is reduced. Therefore, the lifespan of the STA may be increased. However, frame transmission or reception is impossible in the doze state. Therefore, the STA cannot stay for a long time in the doze state. If a pending frame is generated in the doze state, the STA may transition to the awake state to transmit the frame to an access point (AP). However, if the STA is in the doze state and a pending frame to be transmitted to the STA exists in the AP, the STA cannot receive the pending frame from the AP, and cannot know that the pending frame exists in the AP. Therefore, the STA may acquire information regarding the presence/absence of the pending frame in the AP, and may operate by periodically transitioning to the awake mode in order to receive the pending frame in the AP.

The AP may acquire information regarding awake mode operating timing of the STA, and may transmit the information regarding the presence of the pending frame in the AP according to the awake mode operating timing of the STA.

More specifically, in order to receive information regarding the presence/absence of a frame to be received from the AP, the STA may periodically transition from the doze state to the awake state to receive a beacon frame. The AP may report the presence/absence of a frame to be transmitted to each STA on the basis of a traffic indication map (TIM) included in the beacon frame. The TIM is used to report the presence of a unicast frame to be transmitted to the STA, and a delivery traffic indication map (DTIM) may be used to report the presence of a multicast frame/broadcast frame to be transmitted to the STA.

SUMMARY OF THE INVENTION

Technical Objects

An object of the present invention is to provide a method operating based on a power save mode in a wireless local area network (WLAN).

Another object of the present invention is to provide an apparatus operating based on a power save mode in a WLAN.

Technical Solutions

In order to achieve the technical object of the present invention, according to an aspect of the present invention, an operation method based on a power save mode in a wireless LAN includes the steps of performing an initiation configuration procedure by an STA (station) for a configuration of a TIM (traffic indication map)-based power save mode with an AP (access point), performing a shift between a doze state and an awake state based on a transmission cycle of a beacon frame by the STA being operated in the TIM-based power save mode, thereby receiving a first downlink frame from the AP, receiving operation mode configuration information by the STA from the AP, wherein the operation mode configuration information indicates a shift from the TIM-based power save mode to the active mode, and maintaining the awake state of the STA operating in the active mode based on the operation mode configuration information without performing any shifting, thereby receiving a second downlink frame from the AP, wherein the first downlink frame and the second downlink frame include data for live video streaming services, and wherein the operation mode configuration information is generated based on network status information between the STA and the AP.

In order to achieve the technical object of the present invention, according to another aspect of the present invention, an STA (station) being operated based on a power save mode in a wireless LAN includes a RF (radio frequency) unit configured to transmit or receive radio signals, and a processor being operatively connected to the RF unit, wherein the processor is configured to perform an initiation configuration procedure for a configuration of a TIM (traffic indication map)-based power save mode with an AP (access point), to perform a shift between a doze state and an awake state based on a transmission cycle of a beacon frame in accordance with an operation configuration to the TIM-based power save mode, thereby receiving a first downlink frame from the AP, to receive operation mode configuration information from the AP, wherein the operation mode configuration information indicates a shift from the TIM-based power save mode to the active mode, and to maintain the awake state without performing any shifting in accordance with an operation configuration to the active mode based on the operation mode configuration information, thereby receiving a second downlink frame from the AP, wherein the first downlink frame and the second downlink frame include data for live video streaming services, and wherein the operation mode configuration information is generated based on network status information between the STA and the AP.

Effects of the Invention

By saving the power of the STA, real-time video streaming services may be available.

BRIEF DESCRIPTION OF THE DRAWINGS

FIG. 1 is a concept view illustrating the structure of a wireless local area network (WLAN).

FIG. 8 is a conceptual view showing a method for determining a network status according to an exemplary embodiment of the present invention.

FIG. 9 is a conceptual view showing a method for configuring operation modes of the STA performed by the AP according to an exemplary embodiment of the present invention.

FIG. 10 is a conceptual view showing a method for configuring operation modes of the STA performed by the AP according to an exemplary embodiment of the present invention.

FIG. 14 is a conceptual view showing a frame for configuring operation modes of the STA according to the exemplary embodiment of the present invention.

DESCRIPTION OF EXEMPLARY EMBODIMENTS

Figure 2:
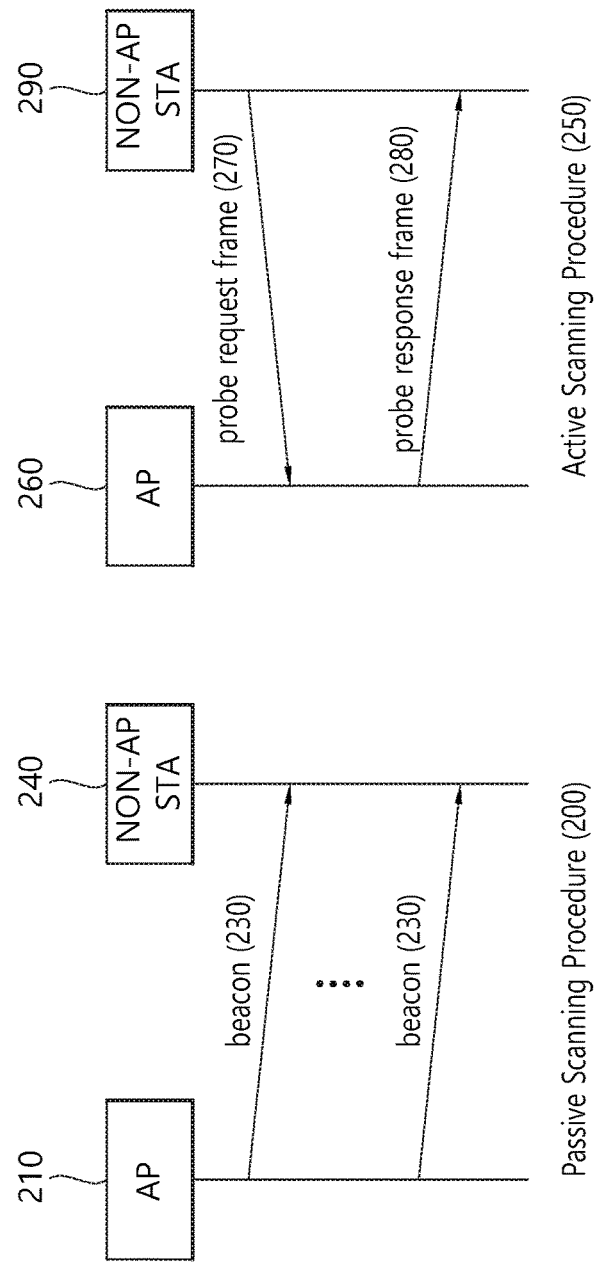
FIG. 2 is a conceptual view showing a scanning method in a wireless LAN.

FIG. 1 is a concept view illustrating the structure of a wireless local area network (WLAN).

An upper part of FIG. 1 shows the structure of the IEEE (institute of electrical and electronic engineers) 802.11 infrastructure network.

Referring to the upper part of FIG. 1, the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Hereinafter, in an embodiment of the present invention, data (or a frame) to be transmitted from the AP to the STA may be expressed by the term 'downlink data (or a downlink frame)', and data (or a frame) to be transmitted from the STA to the AP may be expressed by the term 'uplink data (or an uplink frame)'. In addition, transmission from the AP to the STA may be expressed by the term 'downlink transmission', and transmission from the STA to the AP may be expressed by the term 'uplink transmission'.

FIG. 2 is a conceptual view showing a scanning method in a wireless LAN.

Referring to FIG. 2, the scanning method may be divided into passive scanning 200 and active scanning 250.

Referring to the left side of FIG. 2, passive scanning 200 may be performed by a beacon frame 230, which is periodically broadcasted by an AP 210. The AP 210 of the wireless LAN broadcasts a beacon frame 230 to a non-AP STA 240 at each specific interval (e.g., 100 msec). Information on the current network may be included in the beacon frame 230. By receiving the beacon frame 230 that is periodically broadcasted, the non-AP STA 240 receives the network information and may perform scanning on the AP 240, which will be performing the authentication/association procedure, and the channel.

The passive scanning method 200 may be performed by simply receiving the beacon frame 230 that is being transmitted from the AP 210 without requiring the non-AP STA 240 to transmit any frames. Therefore, the passive scanning 200 is advantageous in that the overall overhead, which occurs due to the transmission/reception of data within the network, is small. However, since the scanning process can only be performed manually in proportion to the cycle of the beacon frame 230, passive scanning 200 is disadvantageous in that the time consumed for performing the scanning process is relatively longer in comparison with the active scanning method. Detailed description on the beacon frame is disclosed in 8.3.3.2 beacon frame of the IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter referred to as IEEE 802.11)', which was disclosed in November 2011. In IEEE 802.11 ai, a beacon frame of another format may be additionally used, and such beacon frame may be referred to as a fast initial link setup (FILS) beacon frame. Additionally, a measurement pilot frame may be used in the scanning procedure as a frame including only a portion of the information of the beacon frame. The measurement pilot frame is disclosed in the IEEE 802.11 8.5.8.3 measurement pilot format.

Additionally, a FILS discovery frame may also be defined. As a frame being transmitted from each AP in-between the transmission cycle periods of the beacon frame, the FILS discovery frame may correspond to a frame that is transmitted while having a cycle period that is shorter than the beacon frame. More specifically, the FILS discovery frame corresponds to a frame that is being transmitted while having a transmission cycle period that is shorter than the beacon frame. The FILS discovery frame may include identifier information (SSID, BSSID) of the AP transmitting the discovery frame. The FILS discovery frame may be transmitted before the beacon frame is transmitted to the STA, so as to allow the STA to discover in advance that an AP exists within the corresponding channel. An interval at which the FILS discovery frame is transmitted is referred to as a FILS discovery frame transmission interval. The FILS discovery frame may be transmitted while including a portion of the information included in the beacon frame.

Referring to the right side of FIG. 2, in active scanning 250, a non-AP STA 290 may transmit a probe request frame 270 to an AP 260, thereby being capable of actively performing a scanning procedure.

After receiving the probe request frame 270 from the non-AP STA 290, the AP 260 waits for a random period of time in order to prevent frame collision. And, then, the AP 260 may include network information to a probe response frame 280 and may transmit the probe response frame 280 to the non-AP STA 290. The non-AP STA 290 may obtain the network information based on the received probe response frame 280 and may then stop the scanning procedure.

In case of active scanning 250, since the non-AP STA 290 actively performs scanning, it is advantageous in that the time consumed for performing the scanning procedure is short. However, since the non-AP STA 290 is required to transmit the probe request frame 270, it is disadvantageous in that the network overhead increases for the transmission and reception of the frames. The probe request frame 270 is disclosed in IEEE 802.11 8.3.3.9, and the probe response frame 280 is disclosed in IEEE 802.11 8.3.3.10.

Once the scanning is completed, the AP and the non-AP STA may perform the authentication and association procedures.

Figure 3:
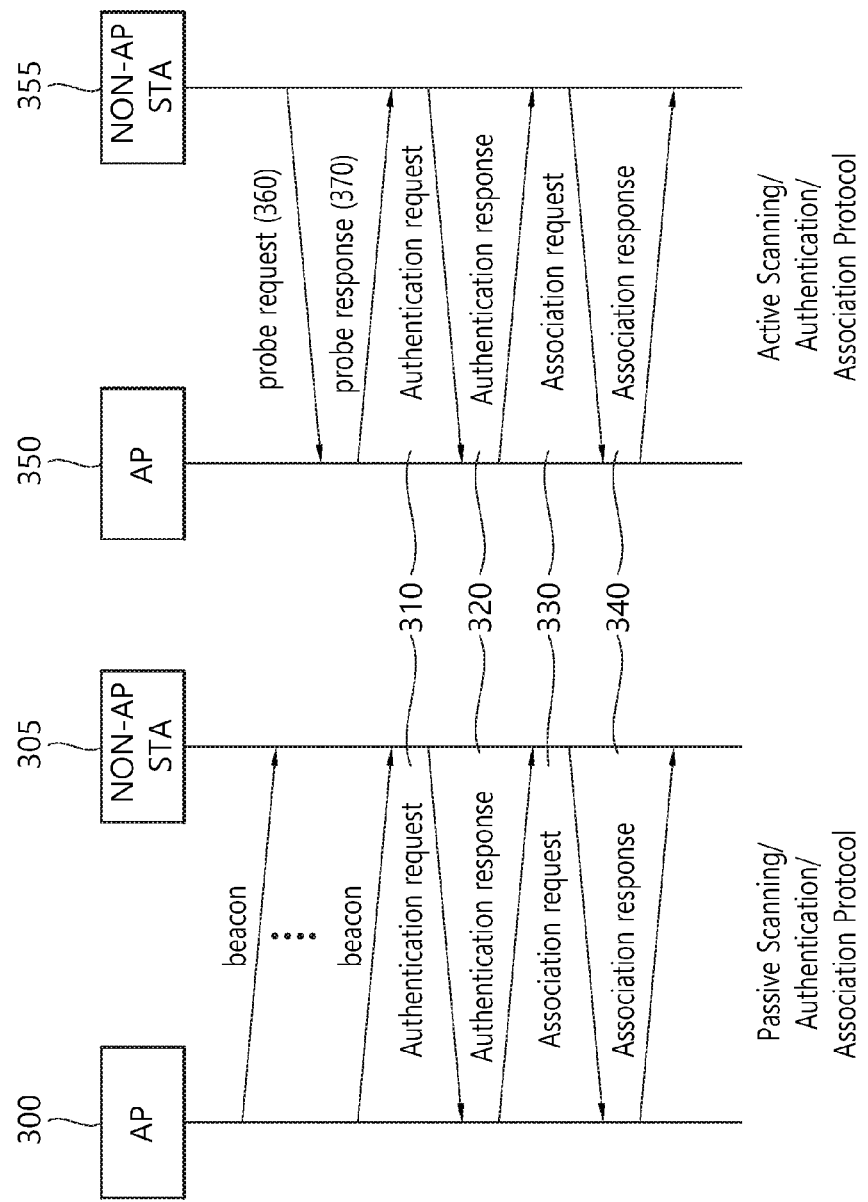
FIG. 3 is a conceptual view showing an authentication Procedure and an authentication procedure that are performed after a scanning procedure of an AP and a STA.

FIG. 3 is a conceptual view showing an authentication Procedure and an authentication procedure that are performed after a scanning procedure of an AP and a STA.

Referring to FIG. 3, after performing the passive/active scanning procedure, the authentication procedure and the association procedure may be performed with one of the scanned APs.

The authentication and association procedures may be performed, for example, through 2-way handshaking. The left side of FIG. 3 is a conceptual view showing the authentication and association procedures after performing passive scanning, and the right side of FIG. 3 is a conceptual view showing the authentication and association procedures after performing scanning.

Regardless of whether the active scanning method or the passive scanning method has been used, the authentication procedure and the association procedure may be equally performed by exchanging an authentication request frame 310/authentication response frame 320 and an association request frame 330/association response frame 340 between the AP 300 and 350 and the non-AP STA 305 and 355.

During the authentication procedure, the non-AP STA 305 and 355 may transmit an authentication request frame 310 to the AP 300 and 350. As a response to the authentication request frame 310, the AP 300 and 350 may transmit an authentication response frame 320 to the non-AP STA 305 and 355. Detailed description on the authentication frame format is disclosed in IEEE 802.11 8.3.3.11.

During the association procedure, the non-AP STA 305 and 355 may transmit an association request frame 330 to the AP 300 and 350. And, as a response to the association request frame 330, the AP 300 and 350 may transmit an association response frame 340 to the non-AP STA 305 and 355. Information related to the ability of the non-AP STA 305 and 355 is included in the association request frame 330, which is transmitted to the AP. Based on the capability information of the non-AP STA 305 and 355, the AP 300 and 350 may determine whether or not the non-AP STA 305 and 355 can be supported. In case the non-AP STA 305 and 355 can be supported, the AP 300 and 350 may transmit the association response frame 340 to the non-AP STA 305 and 355. The association response frame 340 may include information on whether or not the association request frame 330 is accepted and the corresponding reason and capability information of the non-AP STA that can be supported by the corresponding AP. Detailed description on the association frame format is disclosed in IEEE 802.11 8.3.3.5/8.3.3.6.

After the association procedure is carried out between the AP and the non-AP STA, normal transmission and reception of data may be performed between the AP and the non-AP STA. In case the association procedure between the AP and the non-AP STA has failed, based on the reason why the association procedure has failed, the association procedure may be performed once again with the same AP, or a new association procedure may be performed with another AP.

In case the STA is associated with the AP, the STA may be allocated with an association ID (association identifier, AID) from the AP. The AID that is allocated to the STA may correspond to a unique value within one BSS, and the current AID value may correspond to any one of the values within the range of 1~2007. Since 14 bits are allocated for the AID, although a maximum of 16383 bits may be used for the AID value, values within the range of 2008~16383 are reserved.

In the IEEE 802.11 standard, in order to extend the life span of STAs of a wireless LAN, a power save mechanism (Power save Mode) is provided.

An STA, which operates based on the Power Save mode, may reduce its power consumption by operating while shifting to and from an awake state and a doze state, thereby extending the operation life span of the STA. An STA, which operates based on an Active mode, may maintain the awake state. Based on information on a transmission opportunity (TXOP), although the Active mode may include a TXOP Power Save mode, which shifts the STA to and from the awake state and the doze state, it will be assumed that the STA is maintained in the awake state for simplicity.

An STA being in the awake state may perform normal operations, such as transmission or reception of frames, channel scanning, and so on. Conversely, an STA being in the doze state does not perform any transmission or reception of frames and does not perform any channel scanning in order to reduce power consumption. An STA operating in the Power Save mode maintains the doze state in order to reduce power consumption, and, then, when required, the corresponding STA may perform a shift (or transition) to the awake modes so as to carry out communication with the AP.

As the duration time for maintaining the doze state of the STA becomes more extended, the power consumption of the STA may be required, and the life span of the STA may be extended. However, in the doze state, it is impossible for the STA to perform the transmission or reception of frames. if a pending uplink frame exists in the STA, the STA, which was operating in the Power Save mode, may shift from a doze state to an active state, or, if a pending uplink frame exists in the STA, the STA, which was operating in the Power Save mode, may shift from a Power Save mode to an Active mode, thereby being capable of transmitting an uplink frame to the AP. Conversely, in case a pending frame that is to be transmitted to the STA, which is being operated in the doze state, exists in the AP, the AP cannot transmit the pending frame to the STA before the shift of the STA to the Awake mode.

Therefore, the STA operating in the Power Save mode may occasionally shift from the doze state to the awake state and may receive information on whether or not any pending frame for the STA exists from the AP. Considering a shifting time of the STA operating in the Power Save mode to the awake state, the AP may transmit information on the presence of pending downlink data for the STA to the STA.

More specifically, in order to receive information on the presence or absence of a pending frame for the STA, the STA operating in the Power Save mode periodically shifts from the doze state to the awake state, thereby being capable of receiving the beacon frame. As a frame being used for the passive scanning of the STA, the beacon frame may include information on the capability of the AP. The AP may periodically (e.g., 100 msec) transmit a beacon frame to the STA.

Figure 4:
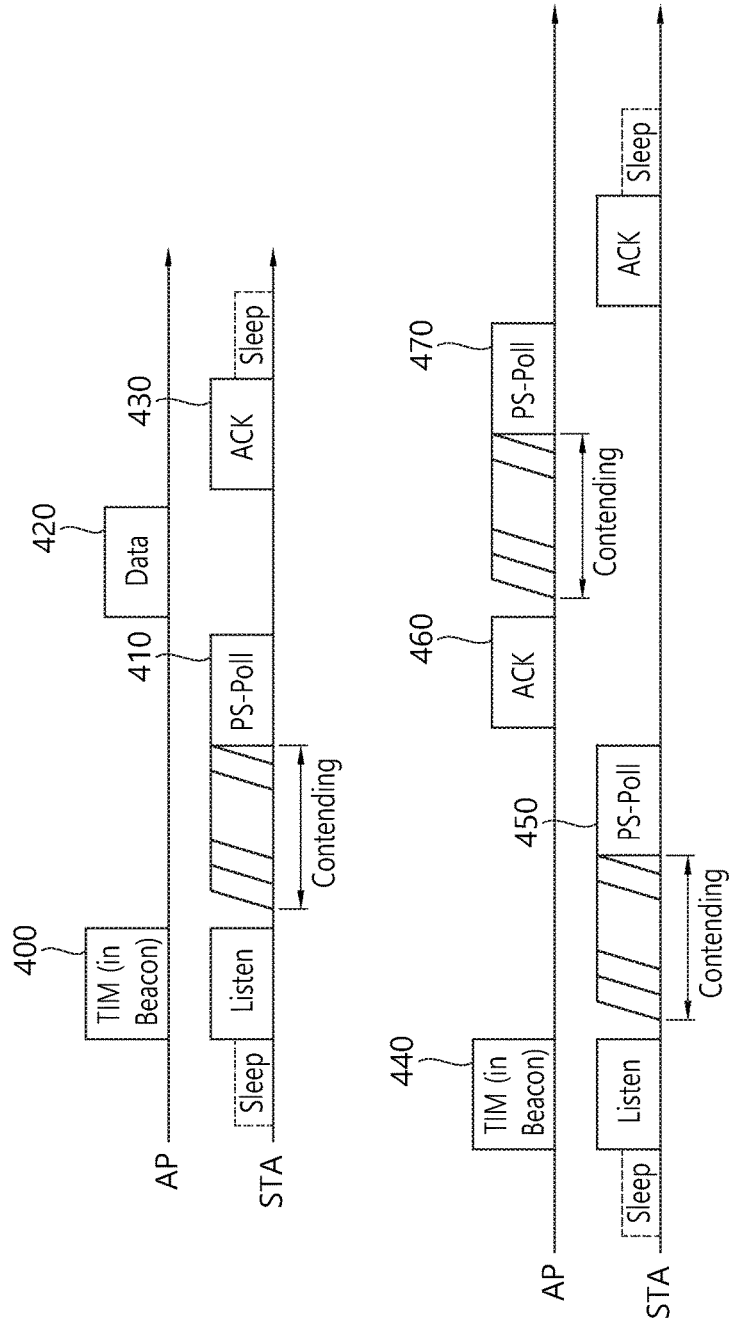
FIG. 4 is a conceptual view showing a beacon frame based power saving method.

FIG. 4 is a conceptual view showing a beacon frame based power saving method.

Referring to FIG. 4, the AP may periodically transmit a beacon frame, and, while considering the transmission timing of the beacon frame, the STA operating in the Power Save mode may periodically shift from the doze state to the awake state, thereby being capable of receiving the beacon frame. The beacon frame based Power Saving method may also be expressed by using the term TIM-based power save mode.

The beacon frame may include a traffic indication map (TIM) element. The TIM element may be used for transmitting the information on the pending downlink data for the STA to the AP. For example, the TIM element may include information on the pending downlink data for the STA based on a bitmap. The TIM element may be identified as a TIM or DTIM (delivery TIM). The TIM may indicate the presence of pending downlink data that are to be transmitted to the STA based on unicast. The DTIM may indicate the presence of pending downlink data that are to be transmitted based on broadcast/multicast.

The upper portion of FIG. 4 discloses a method of an AP for transmitting a downlink frame based on an immediate response to a power save (PS)-poll frame.

Referring to the upper portion of the FIG. 4, the STA may receive information on the presence of pending downlink data for the STA from the AP based on the TIM of the beacon frame 400. The STA may transmit a PS-poll frame 410 to the AP. The AP may receive the PS-poll frame 410 from the STA and may then transmit a downlink frame 420 to the STA as an immediate response to the received PS-poll frame 410. The immediate response to the PS-poll frame of the AP may be performed after a short interframe space (SIFS) after receiving the PS-poll frame.

The STA may transmit an ACK frame 430 as a response to the downlink frame. In case the transmission of the pending downlink data for the STA is ended, the STA operating in the Power Save mode may perform shifting (or transition) back to the doze state.

The lower portion of FIG. 4 discloses a method of an AP for transmitting a downlink frame based on a deferred response to a PS-poll frame.

Referring to the lower portion of the FIG. 4, the STA may receive information on the presence of pending downlink data for the STA from the AP based on the TIM of the beacon frame 440. The STA may transmit a PS-poll frame 450 to the AP. The AP may receive the PS-poll frame 450 from the STA and may then transmit an ACK frame 460 to the STA as a response to the received PS-poll frame 450. After the transmission of the ACK frame 460, the AP may transmit a downlink frame 470 including the pending downlink data to the STA. After receiving the ACK frame 460, the STA may monitor the downlink frame 470 being transmitted by the AP to the STA.

Similarly, in case the transmission of the pending downlink data for the STA is ended, the STA operating in the Power Save mode may perform shifting (or transition) from the awake state back to the doze state.

Figure 5:
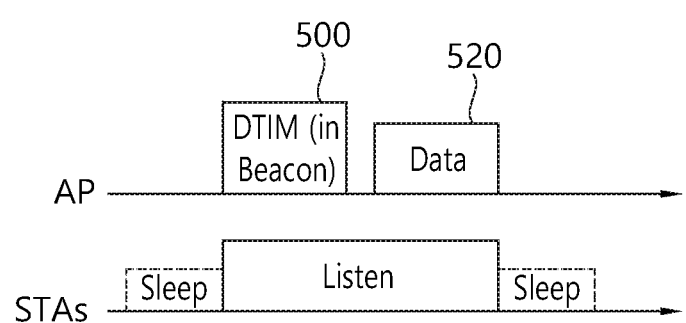
FIG. 5 is a conceptual view showing a beacon frame based power saving method.

FIG. 5 is a conceptual view showing a beacon frame based power saving method.

FIG. 5 discloses a case when a DTIM is delivered through a beacon frame 500. The beacon frame 500 may include a DTIM. As described above, the DTIM may indicate the presence of pending downlink data that are to be transmitted based on broadcast/multicast.

Referring to FIG. 5, the AP may transmit a beacon frame 500 including a DTIM to the STA. After receiving the beacon frame 500 including the DTIM, the STA may maintain the awake state without transmitting the PS-poll frame and may monitor the transmission of the downlink frame 520. The AP may transmit the downlink frame 520 to the STA by using the multicast method or the broadcast method.

Hereinafter, in the exemplary embodiment of the present invention, the transmission from the AP to the STA may also be expressed by using the term downlink transmission. Each of the PPDU, frame, and data being transmitted via downlink transmission may be respectively expressed by using the terms downlink PPDU, downlink frame, and downlink data. The PPDU may correspond to a data unit including a PPDU header, and a physical layer service data unit (PSDU) (or MAC protocol data unit (MPDU)). The PPDU header may include a PHY header and a PHY preamble, and the PSDU (or MPDU) may include a frame or may indicate a frame. The PHY header may also be expressed differently by using the term physical layer convergence protocol (PLCP) header, and the PHY preamble may also be expressed differently by using the term PLCP preamble.

Additionally, the transmission from the STA to the AP may also be expressed by using the term uplink transmission. Each of the PPDU, frame, and data being transmitted via uplink transmission may be respectively expressed by using the terms uplink PPDU, uplink frame, and uplink data.

Hereinafter, a method for performing live video streaming (or real-time video streaming) from the AP to the STA is disclosed in the exemplary embodiment of the present invention. Hereinafter, although the exemplary embodiment of the present invention is described under the assumption that live video streaming is being performed from the AP to the STA, live video streaming may also be performed in the opposite direction from the STA to the AP, and such exemplary embodiment may also be included in the scope of the claims of the present invention.

The video streaming for the transmission of video data may be divided into a buffered video streaming method, a live video streaming method, and so on.

In case the buffered video streaming method is used, the playing video data may be performed before the transmission of the entire video data is completed. For an uninterrupted video streaming, while the video data received by the STA are being played a new set of video data is received by the STA and decoded so as to be played by the STA. In case the buffered video streaming method is used, the video data may be received in advance (buffered in advance) before being played. Therefore, even if network congestion occurs for a predetermined period of time, continuous play of the video data may be performed.

The live video streaming method may be divided into live interactive video transmission and live non-interactive video transmission. The live interactive video transmission may be used for two-way communication, such as video conferences, and the live non-interactive video transmission may be used for performing one-way transmission of video data.

In order to perform live interactive video streaming, the delay for the transmission and playing (or play) of the video data should be less than 150 ms. The delay for the transmission and play of the video data may include a one-way delay, an end-to-end delay, a delay for video encoding, network transmission, and video decoding, and so on.

In order to perform live non-interactive video streaming, lag having a predetermined size may be tolerated between the generation of video data by capturing a live event and the play of the generated video data by the receiving end. However, depending on the characteristics of the live video streaming, a delay equivalent to a time period for receiving in advance video data that are to be played and playing the received video data is not tolerated. Therefore, the quality of the live video streaming may be determined in accordance with the network congestion.

The video data being transmitted via downlink in live video streaming may correspond to data for playing 30 frame per second. In case 30 frames per second are played for live video streaming, the STA may be operated based on the TIM-based power save mode. The TIM-based power save mode may also be expressed by using the term PS-poll power save mode.

More specifically, the STA operating in the TIM-based power save mode is shifted to the awake state at the transmission cycle of the beacon frame, and then, after receiving video data from the AP, the STA may be shifted to the doze state. The STA may decode and play the video data that are received before the transmission of the next beacon frame, and, when the next beacon frame is transmitted, the STA may be shifted back to the awake state, thereby being capable of receiving the video data from the AP. In order to allow the STA operating in the TIM-based power save mode to perform live video streaming, the level of network congestion (or network congestion level) should be low. In case the level of network congestion is high, after being shifted to the awake state, due to the congestion in the network, the STA is incapable of receiving the video data from the AP, and it may also be impossible to carry out continuous video streaming.

In the exemplary embodiment of the present invention, operations of a TIM-based power save mode or active mode of the STA in consideration of the network congestion level will be disclosed. For example, in case the network congestion level is low, the STA operates in the TIM-based power save mode and carries on its operation by shifting to and from the awake state and the doze state. Conversely, in case the network congestion level is high, the STA operates in the active mode so as to maintain the awake state.

More specifically, the STA may operate by shifting to and from the TIM-based power save mode and the active mode in accordance with the network congestion level. The network congestion level may be decided based on wide area network (WAN) metric information, which is transmitted by the AP. The WAN metric information may be generated based on an access network query protocol (ANQP) and may then be transmitted to the AP. The ANQP may correspond to a protocol for transmitting information on the network status to the STA (or AP). For example, the STA (or AP) may inquire information on the network based on the ANQP, thereby being capable of acquiring information on the network status. The information on the network may include information on the network congestion level, information on the capability of the network, information on the authentication type, and so on.

Hereinafter, it will be assumed that the STA corresponds to an STA receiving live video streaming services.

Figure 6:
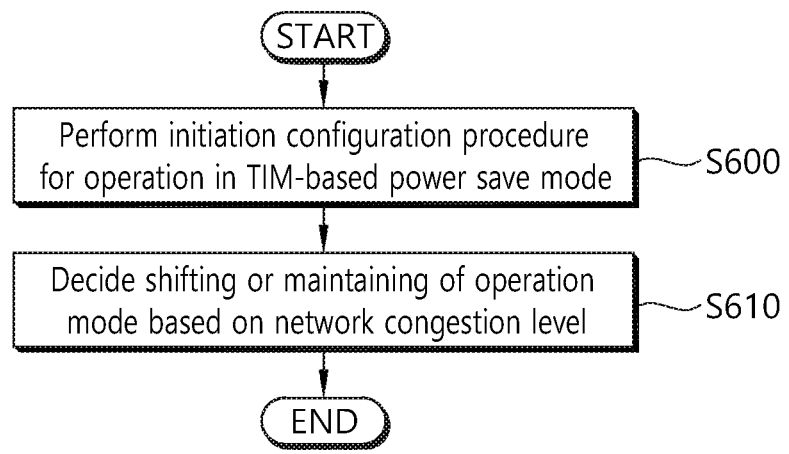
FIG. 6 is a conceptual view showing a real-time video streaming method to a STA according to an exemplary embodiment of the present invention.

FIG. 6 is a conceptual view showing a real-time video streaming method to a STA according to an exemplary embodiment of the present invention.

In FIG. 6, a method for performing live video streaming from an AP to an STA is disclosed.

Referring to FIG. 6, an application for live video streaming may be executed in the STA.

The STA may detect the operation for live video streaming and may configure (or set up) its operation mode to the TIM-based power save mode.

The STA may perform an initiation configuration procedure for operating in the TIM-based power save mode (step S600).

The initiation operation for operating in the TIM-based power save mode of the STA may be carried out based on the transmission and reception of an add traffic stream (ADDTS) request frame and an ADDTS response frame between the STA and the AP. The initiation operation for the TIM-based power save mode of the STA will hereinafter be described in detail.

The STA may shift its operation mode or may maintain its operation mode based on the network congestion level (step S610).

The AP transmitting video data to the STA based on live video streaming may detect and predict the network congestion level. Additionally, the AP may transmit information on the network congestion level to the STA. For example, the AP may transmit the information on the network congestion level to the STA through a beacon frame.

The STA may decide whether or not to shift from the TIM-based power save mode to the active mode based on the information on the network congestion level. In case the network congestion level is determined to be high, the STA may be shifted from the TIM-based power save mode to the active mode and may then receive video data. And, conversely, in case the network congestion level is determined to be low, the STA may maintain its TIM-based power save mode and may then receive the video data from the AP.

Alternatively, the AP may directly indicate the operation mode of the STA. For example, in case the network congestion level is high, the AP may command (or request) the operation mode of the STA to be shifted from the TIM-based power save mode to the active mode. Conversely, in case the network congestion level is low, the AP may command (or request) the operation mode of the STA to be maintained in the TIM-based power save mode. Alternatively, the AP may transmit the information on the network congestion level to the STA and may authorize an operation mode shift in accordance with the operation mode shift request of the STA. This will be described in more detail later on.

Figure 7:
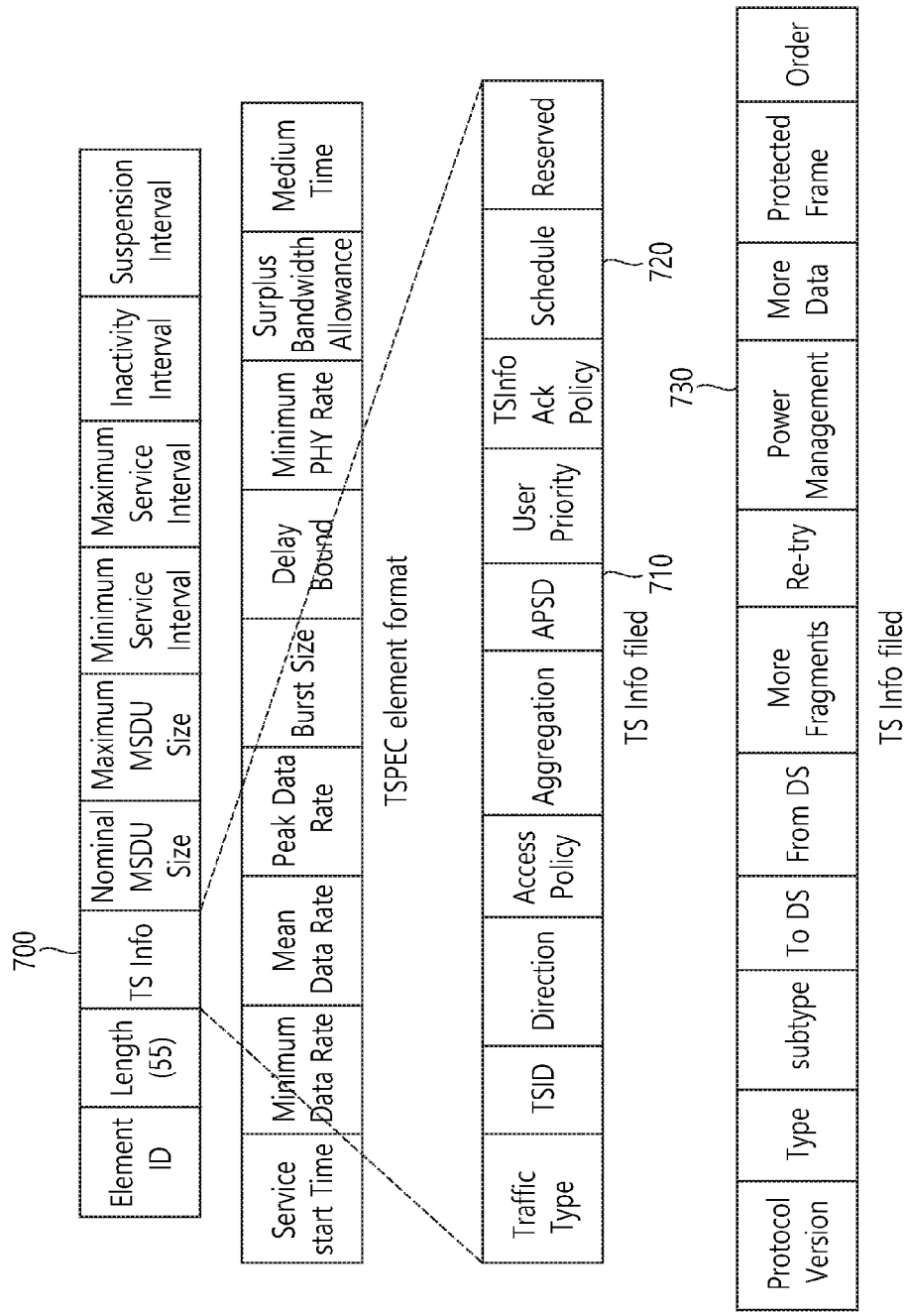
FIG. 7 is a conceptual view showing an initial operation for a TIM-based power save mode operation of a STA according to an exemplary embodiment of the present invention.

FIG. 7 is a conceptual view showing an initial operation for a TIM-based power save mode operation of a STA according to an exemplary embodiment of the present invention.

In FIG. 7, a configuration of the TIM-based power save mode based on the ADDTS request frame and the ADDTS response frame is disclosed.

Referring to FIG. 7, the ADDTS request frame may include a TSPEC element as its information element.

The TSPEC element of the ADDTS request frame is disclosed in 8.4.2.29 TSPEC element of the IEEE Standard for Information technology-Telecommunications and information exchange between systems Local and metropolitan area networks-Specific requirements Part 11: Wireless LAN Medium Access Control (MAC) and Physical Layer (PHY) Specifications (hereinafter referred to as the IEEE 802.11 spec), which as disclosed in October, 2013.

Additionally, information included a TS info field 700, which is included in the TSPEC element, is also disclosed in FIG. 8-197 of 8.4.2.29 TSPEC element of the IEEE 802.11 spec.

The STA may configure the TIM-based power save mode based on an automatic power save delivery (APSD) field 710 and a schedule field 720, which are included in the TS info field 700.

The STA may transmit the ADDTS request frame including the TS info field 700, which includes the APSD field 710 that is set to 0 and the schedule field 720 that is set to 0, and a power save field 730 that is set to 1 in its MAC header to the AP. The structure of the MAC header is disclosed in 8.2.4.1 frame control field of the IEEE 802.11 spec.

By transmitting the ADDTS request frame including the fields that are configured (or set up) as described above, the STA may request to be operated in the TIM-based power save mode.

The AP may receive the ADDTS request frame including the fields that are configured as described above from the STA and may then decide whether or not to the STA is to be operated in the TIM-based power save mode. The AP may decide the operation of STA in the TIM-based power save mode and may transmit the ADDTS response frame to the STA. The ADDTS response frame may also include a TSPEC element. The AP may transmit the ADDTS request frame including the TS info field 700, which includes the APSD field 710 that is set to 0 and the schedule field 720 that is set to 0, and a power save field 730 that is set to 1 in its MAC header to the STA.

The STA may receive the ADDTS response frame from the AP and may be operated in the TIM-based power save mode.

FIG. 8 is a conceptual view showing a method for determining a network status according to an exemplary embodiment of the present invention.

In FIG. 8, a method for determining the network status (e.g., network congestion level) of the STA and/or AP is disclosed.

In order to determine the network status, BSS load information, WAN metric information, and so on, may be used. For example, the AP and/or STA may determine the network congestion level based on the BSS load information, WAN metric information, and so on.

The BSS load information may include channel utilization information and STA count information.

The channel utilization information may include information on a time period during which the channel is busy. For example, the channel utilization information may include information on a ratio of a time duration during which the channel is sensed as being busy during a time period corresponding to a specific beacon transmission interval.

The STA count information may include information on the total number of STA being associated with the current BSS.

The WAN metric information may include WAN information 800, downlink speed information 810, uplink speed information 820, downlink load information 830, uplink load information 840, and local measurement duration information 850.

The WAN information 800 may include information on Up/Down/Test link status, information on whether or not the link is a symmetric link, and so on.

The downlink speed information 810 may include information on the downlink speed in the WAN.

The uplink speed information 820 may include information on the uplink speed in the WAN.

The downlink load information 830 may include information on a ratio of the WAN downlink that is being used.

The uplink load information 840 may include information on a ratio of the WAN uplink that is being used.

The local measurement duration information 850 may include information on a duration during which the downlink load and the uplink load are measured.

The AP may transmit the above-described BSS load information and/or WAN metric information to the STA through a beacon frame.

The STA may determine the network congestion level based on the BSS load information and/or WAN metric information and may decide to shift between the TIM-based power save mode and the active mode. Alternatively, in case the operation status of the STA is configured (or set up) by the AP, the AP may determine the network congestion level based on the BSS load information and/or WAN metric information and may decide the shifting between the TIM-based power save mode and the active mode.

For example, the AP may determine the network congestion level as described below based on the BSS load information. In case the ratio of a time duration during which the channel is sensed as being busy, which is acquired based on the channel utilization channel, is equal to or greater than a predetermined threshold value, the AP may determine that the network congestion level is high. Alternatively, if the total number of STAs being associated with the current BSS, which is acquired based on the STA count information, is equal to or greater than a predetermined threshold value, the AP may determine that the network congestion level is high.

For example, the AP may determine the network congestion level as described below based on the WAN metric information.

In case interactive live video stream is being carried out, and in case each of the downlink speed and the uplink speed, which are respectively acquired based on the downlink speed information and the uplink speed information, is greater than the predetermined threshold value, and in case both the downlink load information and the uplink load information are smaller than the predetermined threshold value, the AP may determine that the network congestion level is low. Additionally, in case non-interactive live video stream is being carried out, and in case the downlink speed that is acquired based on the downlink speed information is greater than the predetermined threshold value, and in case the downlink load information is smaller than the predetermined threshold value, the AP may determine that the network congestion level is low.

Each of the threshold values for determining the network congestion level may be configured (or set up) in the AP as a fixed value or may correspond to values that are differently configured (or set up) in accordance with the embodiment of the AP.

FIG. 9 is a conceptual view showing a method for configuring operation modes of the STA performed by the AP according to an exemplary embodiment of the present invention.

In FIG. 9, a configuration method of the operation status (TIM-based power save mode or active mode) of the STA performed by the AP is disclosed.

Referring to FIG. 9, the AP may configure the operation status of the STA through a power management bit map 920 corresponding to a TIM bitmap 900.

Each bit being included in the power management bit map 920 may correspond to each bit of the TIM bitmap 900 indicating information on the pending data for the STA. In case the value of the bit being included in the power management bitmap 920 is equal to 0, the operation in the active mode is indicated, and in case the value of the bit being included in the power management bitmap 920 is equal to 1, the power save mode (e.g., operation in the TIM-based power save mode) may be indicated.

For example, an 8-bit TIM bitmap 900 and an 8-bit power management bitmap 920 corresponding to the 8-bit TIM bitmap 900 may be defined.

The 8-bit TIM bitmap 900 may indicate the presence of pending downlink data for each of STA1 to STA8 by using '11110000'. In case the 8-bit TIM bitmap 900 is equal to '11110000', the pending downlink data for each of STA1, STA2, STA3, and STA4 may be indicated. By using '11001111', the 8-bit of the power management bitmap 920 may be in correspondence with the TIM bitmap 900, thereby indicating the operation status of each of STA1 to STA8. More specifically, the 8-bit of the power management bitmap 920 may indicate that, among STA1 to STA4 each having the pending downlink data, STA1 and STA2 operates in the power save mode, and STA3 and STA4 operate in the active mode.

The AP may generate an 8-bit TIM bitmap 900 while considering the presence or absence of pending downlink data for each of STA1 to STA8. Additionally, the AP may generate a power management bitmap 920 for configuring the operation status of each STA having pending downlink data, while considering a channel congestion level between each of the STAs (STA1 to STA4) having pending downlink data.

In case the channel congestion level between the AP and each of the STA1 and STA2 is high, indications to be operated in the power save mode may be sent to each of STA1 and STA2 through the power management bitmap 920. Conversely, in case the channel congestion level between the AP and each of STA3 and STA4 is low, indication to be operated in the active mode may be sent to each of STA3 and STA4 through the power management bitmap 920.

For the STAs do not include any pending data (e.g., STA5 to STA8), the AP may configure settings through the power management bitmap 920 so that the corresponding STAs can operate in the power save mode.

Alternatively, according to the exemplary embodiment of the present invention, the power management bitmap 920 may be used for configuring the operation modes of the STAs that are indicated to include pending downlink data based on the TIM bitmap 900. For example, the power management bitmap 920 may be configured 4 bits indicating '1100', and the power management bitmap 920 '1100' may correspond to each of STA1 to STA4, which are indicated to include pending downlink data, based on the TIM bitmap 900.

The STA may receive the TIM bitmap 900 and the power management bitmap 920 and may configure the operation status. Among the STAs, the STAs having pending uplink data that are to be transmitted to the AP via uplink may maintain their active state, even in case the corresponding STAs are set to the power save mode by the AP, and may also transmit pending uplink data to the AP.

FIG. 10 is a conceptual view showing a method for configuring operation modes of the STA performed by the AP according to an exemplary embodiment of the present invention.

In FIG. 10, a configuration method of the operation status (TIM-based power save mode or active mode) of the STA performed by the AP is disclosed. Most particularly, a virtual TIM bitmap 1000 receiving video data based on live video streaming is defined in FIG. 10.

Referring to FIG. 10, the AP may configure the operation mode of the STA through the virtual TIM bitmap 1000 and its corresponding power management bitmap 1020.

The virtual TIM bitmap 1000 may correspond to a bitmap that is separately defined only for STAs receiving live video-streamed data.

More specifically, each bit of the virtual TIM bitmap 1000 may correspond to each of the multiple STAs being serviced with live video streaming services. Hereinafter, an STA being serviced with live video streaming services may also be expressed as a live streaming service STA.

The virtual TIM bitmap 1000 may include information on the presence or absence of pending downlink data for each of the live streaming service STAs.

The power management bitmap 1020 may be in correspondence with the virtual TIM bitmap 1000 and may include information for configuring the operation mode of each live streaming service STA.

For example, the virtual TIM bitmap 1000 may be equal to '01110001'. And, the virtual TIM bitmap 1000 may indicate the presence of pending downlink data for each of the live streaming service STA2, STA3, STA4, and STA8.

The power management bitmap 1020 may be equal to '00110000'. The power management bitmap 1020 may indicate the power save mode operations of the live streaming service STA3 and STA4 and may also indicate the active mode operations of the live streaming service STA2 and STA8.

The AP may generate the power management bitmap 1020 based on the channel congestion level between a live streaming service STA and the AP.

The AP may configure the operation mode of each of the live streaming service STAs having pending downlink data based on the information on a network status (e.g., network congestion level) between the AP and each of the live streaming service STAs having pending downlink data.

Figure 11:
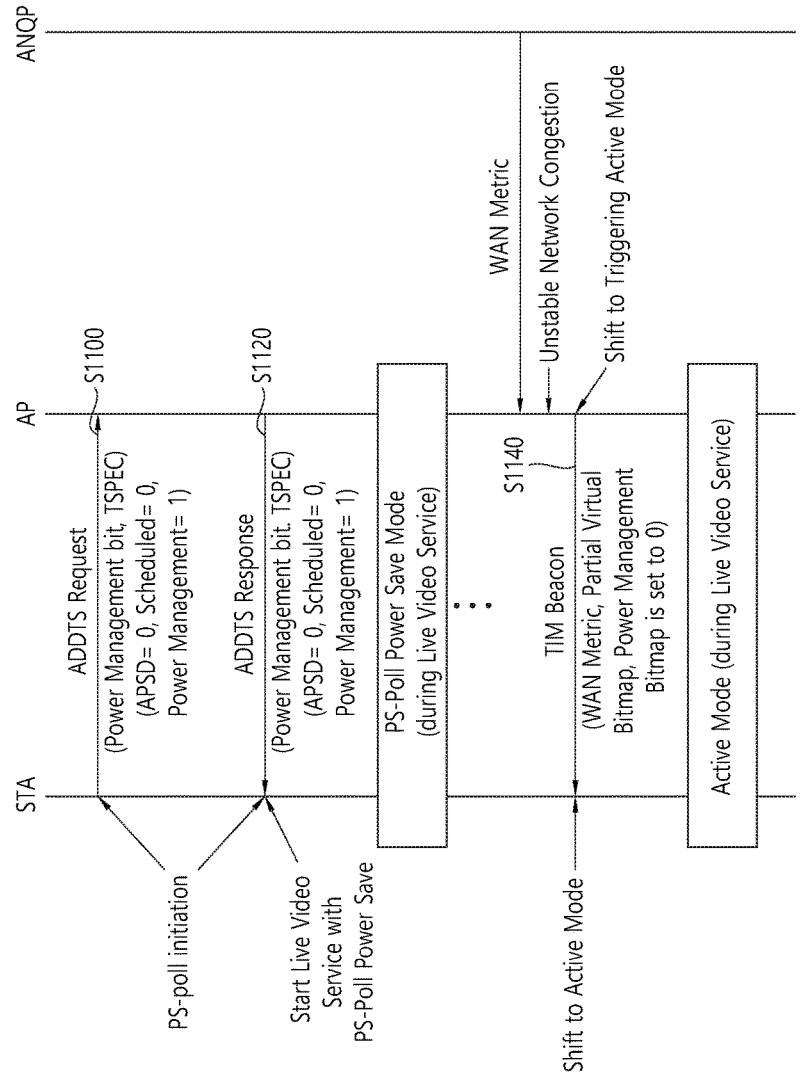
FIG. 11 is a conceptual view showing a method for configuring operation modes of the STA according to an exemplary embodiment of the present invention.

FIG. 11 is a conceptual view showing a method for configuring operation modes of the STA according to an exemplary embodiment of the present invention.

FIG. 11 discloses a method of configuring the initiation operation mode of the STA to the TIM-based power save mode and shifting the STA, which is serviced with live video streaming services from the AP, from the TIM-based power save mode to the active mode by the AP.

Referring to FIG. 11, the STA may transmit an ADDTS request frame to the AP in order to configure the initiation operation mode to the TIM-based power save mode (step S1100).

The ADDTS request frame may include an APSD field being set to 0 within the TSPEC information element, and a power management field being set to 1, wherein the power management field includes a scheduling field that is set to 0 and is included in the MAC header. Based on the configuration of each field included in the above-described ADDTS request frame, the STA may request the AP to configure the TIM-based power save mode as its initiation operation mode.

In response to the ADDTS request frame, the AP may transmit an ADDTS response frame to the STA (step S1120).

The STA that has transmitted the ADDTS request frame may acquire information on whether or not to authorize the TIM-based power save mode of the STA through the ADDTS response frame, which is transmitted by the AP.

The ADDTS response frame, which is being transmitted by the AP in order to authorize the TIM-based power save mode operation, may include an APSD field being set to 0 within the TSPEC information element, and a power management field being set to 1, wherein the power management field includes a scheduling field that is set to 0 and is included in the MAC header.

The STA may receive the ADDTS response frame and may operate in the TIM-based power save mode, thereby being capable of receiving live video streaming services.

While providing live video streaming services to the STA, the AP may receive WAN metric information based on the ANQP. The AP may determine the network status (e.g., network congestion level) based on the received WAN metric information and may then determine whether or not the STA can be maintained in the TIM-based power save mode.

In case it is impossible to maintain the STA in the TIM-based power save mode due to a high network congestion level, the AP may decide the shifting of the STA from the TIM-based power save mode to the active mode. Conversely, in case it is possible to maintain the STA in the TIM-based power save mode due to a low network congestion level, the AP may decide the operation mode of the STA to be maintained in the TIM-based power save mode.

The AP may transmit information on the shifting of the STA to the active mode or information on the maintaining of the TIM-based power save mode based on power management bitmap (step S1140).

In FIG. 11, the case when the AP decides the shifting of the STA from the TIM-based power save mode to the active mode due to a high network congestion level will be assumed.

The AP may transmit a power management bitmap corresponding to the TIM bitmap through a beacon frame, or the AP may transmit a power management bitmap corresponding to the virtual TIM bitmap through a beacon frame.

The power management bitmap may include bit information for the shifting of the operation mode of the STA from the power save mode to the active mode.

The STA, which has received the power management bit map including the bit information for the shifting of the operation mode of the STA from the power save mode to the active mode from the AP, may shift its operation mode from the power save mode to the active mode. The STA may receive live video streaming services from the AP when operating in the active mode.

Figure 12:
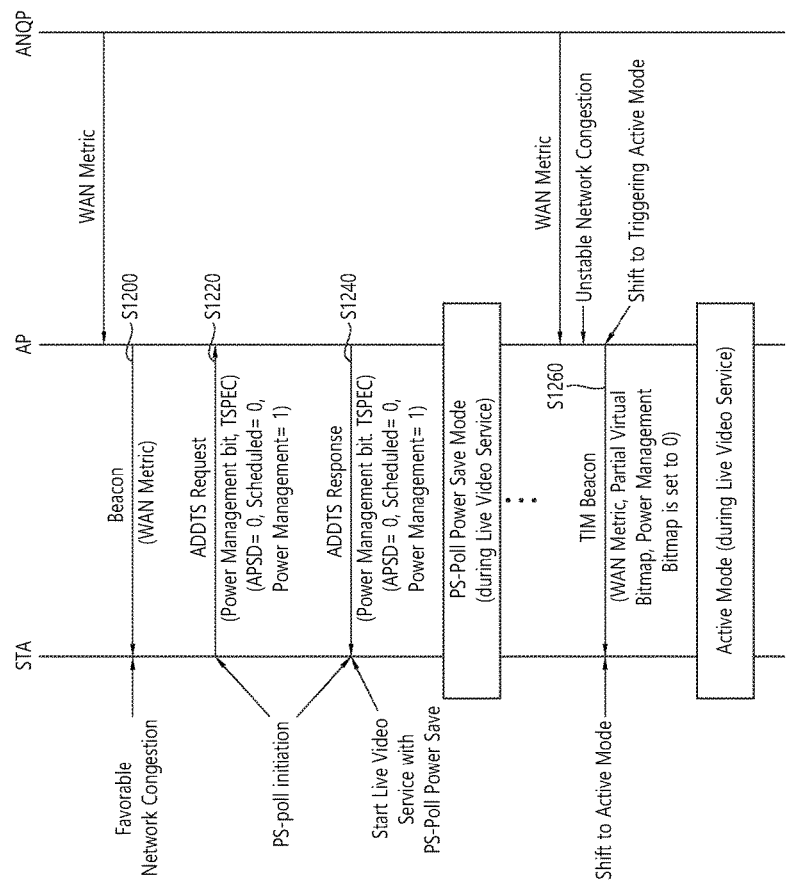
FIG. 12 is a conceptual view showing a method for configuring operation modes of the STA according to an exemplary embodiment of the present invention.

FIG. 12 is a conceptual view showing a method for configuring operation modes of the STA according to an exemplary embodiment of the present invention.

FIG. 12 discloses a method, wherein the STA initiates the TIM-based power save mode and receives a live video streaming service from the AP, and wherein the STA is shifted to the active mode from the TIM-based power save mode by the AP. Most particularly, FIG. 12 discloses a case when the configuration of the initiation operation mode of the STA is performed based on a beacon frame, which is transmitted by the AP.

Referring to FIG. 12, the STA may receive network status information from the AP (step S1200).

The AP may receive WAN metric information based on an ANQP, and the STA may receive the WAN metric information through a beacon frame, which is transmitted by the AP.

According to the determined result based on the WAN metric information, in case the network congestion level is low, the STA may be operated in the TIM-based power save mode in order to receive the live streaming service. Conversely, according to the determined result based on the WAN metric information, in case the network congestion level is high, the STA may operate in the active mode in order to receive the live streaming service.

FIG. 12 discloses a case when the STA configures its initiation operation mode to the TIM-based power save mode and receives the live video streaming service.

The STA may transmit an ADDTS request frame to the AP in order to configure the initiation operation mode to the TIM-based power save mode (step S1220).

The ADDTS request frame may include an APSD field being set to 0 within the TSPEC information element, and a power management field being set to 1, wherein the power management field includes a scheduling field that is set to 0 and is included in the MAC header. Based on the configuration of each field included in the above-described ADDTS request frame, the STA may request the AP to configure the TIM-based power save mode as its initiation operation mode.

In response to the ADDTS request frame, the AP may transmit an ADDTS response frame to the STA (step S1240).

The STA that has transmitted the ADDTS request frame may transmit information on whether or not to authorize the TIM-based power save mode through the ADDTS response frame, which is transmitted by the AP.

The ADDTS response frame, which is being transmitted by the AP in order to authorize the TIM-based power save mode operation, may include an APSD field being set to 0 within the TSPEC information element, and a power management field being set to 1, wherein the power management field includes a scheduling field that is set to 0 and is included in the MAC header.

The STA may receive the ADDTS response frame and may operate in the TIM-based power save mode, thereby being capable of receiving live video streaming services.

While providing live video streaming services to the STA, the AP may receive WAN metric information based on the ANQP. The AP may determine the network status (e.g., network congestion level) based on the received WAN metric information and may then determine whether or not the TIM-based power save mode can be maintained.

In case it is impossible to maintain the TIM-based power save mode due to a high network congestion level, the AP may decide the shifting of the STA from the TIM-based power save mode to the active mode. Conversely, in case it is possible to maintain the TIM-based power save mode due to a low network congestion level, the AP may decide the operation mode of the STA to be maintained in the TIM-based power save mode.

The AP may transmit information on the shifting of the STA to the active mode or information on the maintaining of the TIM-based power save mode based on power management bitmap.

In FIG. 12, the case when the AP decides the shifting of the STA from the TIM-based power save mode to the active mode due to a high network congestion level will be assumed.

The AP may transmit a power management bitmap corresponding to the TIM bitmap through a beacon frame, or the AP may transmit a power management bitmap corresponding to the virtual TIM bitmap through a beacon frame (step S1260).

The power management bitmap may include bit information for the shifting of the operation mode of the STA from the power save mode to the active mode.

The STA, which has received the power management bit map including the bit information for the shifting of the operation mode of the STA from the power save mode to the active mode from the AP, may shift its operation mode from the power save mode to the active mode. The STA may receive live video streaming services from the AP when operating in the active mode.

A case when the STA receives WAN metric information through the beacon frame in order to receive the live streaming service is assumed in FIG. 12. However, the STA may also receive the WAN metric information through a generic advertisement service (GAS) protocol instead of the beacon frame. The GAS may be used for delivering information on an external network to the STA. The GAS may be used for acquiring information on a network service of the STA before the association of the STA with the AP. The STA may transmit a GAS query frame to the AP, and the AP may transmit a GAS response frame to the STA. The GAS frame that is transmitted by the AP may include the WAN metric information.

Figure 13:
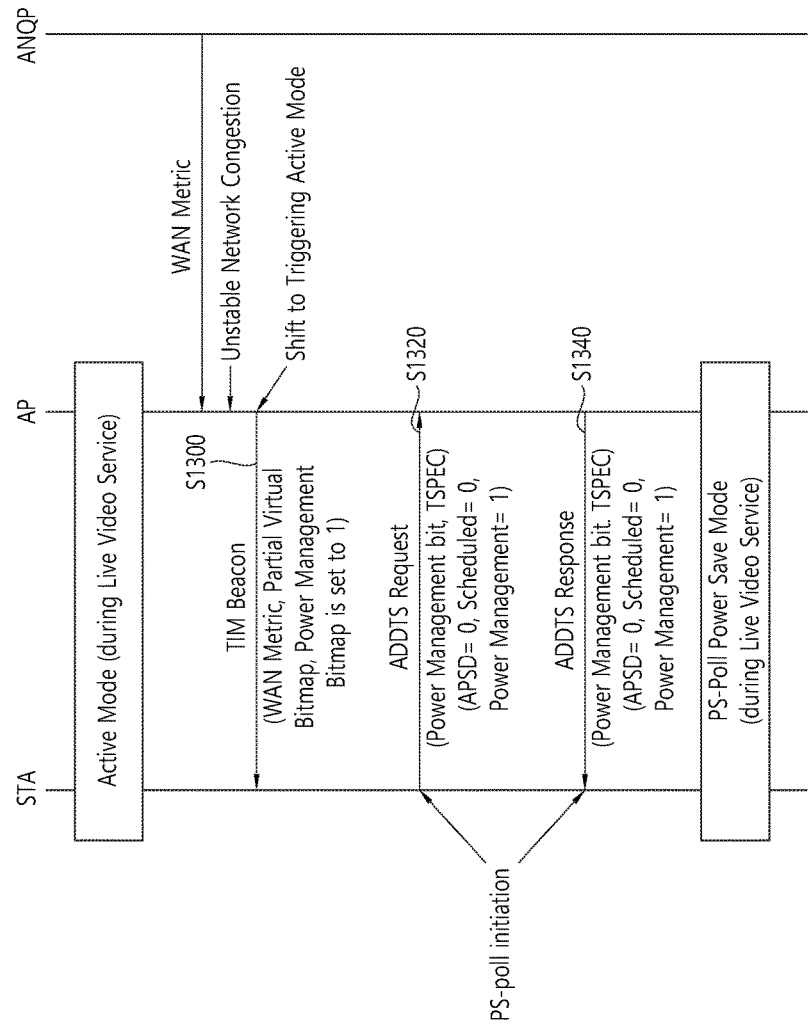
FIG. 13 is a conceptual view showing a method for configuring operation modes of the STA according to an exemplary embodiment of the present invention.

FIG. 13 is a conceptual view showing a method for configuring operation modes of the STA according to an exemplary embodiment of the present invention.

FIG. 13 discloses a method of shifting the STA from the active mode to the TIM-based power save mode, while the STA is receiving a live streaming service.

Referring to FIG. 13, the STA may receive network status information from the AP (step S1300).

The AP may receive WAN metric information based on an ANQP, and the STA may receive the WAN metric information through a beacon frame, which is transmitted by the AP.

While providing live video streaming services to the STA, the AP may receive WAN metric information based on the ANQP. The AP may determine the network status (e.g., network congestion level) based on the received WAN metric information and may then determine whether or not the active mode of the STA can be maintained.

In case the network congestion level is high, the AP may decide to maintain the active mode of the STA. Conversely, in case the network congestion level is low, the AP may decide the shifting of the STA to the TIM-based power save mode.

The AP may transmit information on the maintaining of the active mode of the STA or information on the shifting of the STA to the TIM-based power save mode based on power management bitmap.

In FIG. 13, the case when the AP decides the shifting of the operation mode of the STA from the active mode to the TIM-based power save mode due to a low network congestion level will be assumed.

The AP may transmit a power management bitmap corresponding to the TIM bitmap through a beacon frame, or the AP may transmit a power management bitmap corresponding to the virtual TIM bitmap through a beacon frame.

The power management bitmap may include bit information for the shifting of the operation mode of the STA from the active mode to the power save mode.

The STA, which has received the power management bit map including the bit information for the shifting of the operation mode of the STA from the active mode to the power save mode from the AP, may shift its operation mode from the active mode to the power save mode.

The STA may transmit an ADDTS request frame to the AP in order to configure the initiation operation mode to the TIM-based power save mode (step S1320).

The ADDTS request frame may include an APSD field being set to 0 within the TSPEC information element, and a power management field being set to 1, wherein the power management field includes a scheduling field that is set to 0 and is included in the MAC header. Based on the configuration of each field included in the above-described ADDTS request frame, the STA may request the AP to configure the TIM-based power save mode as its initiation operation mode.

In response to the ADDTS request frame, the AP may transmit an ADDTS response frame to the STA (step S1340).

The STA that has transmitted the ADDTS request frame may transmit information on whether or not to authorize the TIM-based power save mode through the ADDTS response frame, which is transmitted by the AP.

The ADDTS response frame, which is being transmitted by the AP in order to authorize the TIM-based power save mode operation, may include an APSD field being set to 0 within the TSPEC information element, and a power management field being set to 1, wherein the power management field includes a scheduling field that is set to 0 and is included in the MAC header.

The STA may receive the ADDTS response frame and may operate in the TIM-based power save mode, thereby being capable of receiving live video streaming services. The STA may receive live video streaming services from the AP while operating in the power save mode.

FIG. 14 is a conceptual view showing a frame for configuring operation modes of the STA according to the exemplary embodiment of the present invention.

For the TIM-based power save mode, a separate frame may be defined instead of the ADDTS request frame and the ADDTS response frame.

FIG. 14 discloses an operation mode request frame and an operation mode response frame that can be used for the configuration of the initiation operation mode of the STA and a request for changing the operation mode.

The upper part of FIG. 14 is a conceptual diagram showing an operation mode request frame.

Referring to the upper part of FIG. 14, the operation mode request frame may include a Requested Operation Mode field 1400, a Reception Data Category field 1410, and a Reception Condition Field 1420.

The Requested Operation Mode field 1400 may include information on the operation mode. For example, the requested operation mode may correspond to the TIM-based power save mode or the active mode. In case the value of the Requested Operation Mode field 1400 is equal to 0, the TIM-based power save mode may be requested, and, in case the value of the Requested Operation Mode field 1400 is equal to 1, the active mode may be requested.

In addition to the TIM-based power save mode and the active mode, the value of the Requested Operation Mode field 1400 may also be used to request other operation modes of the STA.

The Reception Data Category field 1410 may receive information on the characteristics of the data that are to be received by the STA. For example, the Reception Data Category field 1410 may include information indicating whether the data that are to be received by the STA correspond to live video streaming data or buffered video streaming data. Alternatively, the Reception Data Category field 1410 may include information on access category of the data that are received by the STA. The access category of the data being received by the STA may be categorized as any one of access category (AC)_voice (VO), AC_video (VI), AC_background (BK), and AC_best effort (BE).

The Reception Condition Field 1420 may include information on the condition for receiving data that are transmitted to the STA for an application that is being executed in the STA. For example, the Reception Condition Field 1420 may include information on a threshold size of a reception delay for a normal operation of an application, information on a threshold error rate of the received data, information on a threshold channel status, and so on.

The lower part of FIG. 14 is a conceptual diagram of an operation mode response frame.

In the lower part of FIG. 14, the operation mode response frame may include an Operation Mode Configuration field 1450, a Transmission Data Category field 1460, and a Transmission Condition field 1470.

The Operation Mode Configuration field 1450 may include information on whether or not the configuration of a requested operation mode for the operation mode request of the STA is authorized. In case the requested operation mode of the STA is authorized based on the Operation Mode Configuration field 1450, the Operation Mode Configuration field 1450 may be set to 1, and in case the requested operation mode of the STA is not authorized based on the Operation Mode Configuration field 1450, the Operation Mode Configuration field 1450 may be set to 0.

The Transmission Data Category field 1460 may include information on the characteristics of the data that are to be transmitted to the STA. For example, the Transmission Data Category field 1460 may include information on whether the data that are to be transmitted by the AP correspond to live video streaming data or buffered video streaming data. Alternatively, the Transmission Data Category field 1460 may include information on access category of the data that are to be transmitted to the STA. The access category of the data being received by the STA may be categorized as any one of access category (AC)_voice (VO), AC_video (VI), AC_background (BK), and AC_best effort (BE).

The Transmission Condition field 1470 may include information on the transmission condition of the data that are being transmitted to the STA. For example, the Transmission Condition field 1470 may include information on an expected delay of the data that are to be transmitted, information on an expected delay rate, information on an expected channel status for the transmission of data, and so on.

The operation mode of the STA may also be configured based on the transmission and reception of the operation mode request frame and the operation mode response frame instead of the transmission and reception of the above-described ADDTS request frame and the ADDTS response frame between the STA and the AP.

Figure 15:
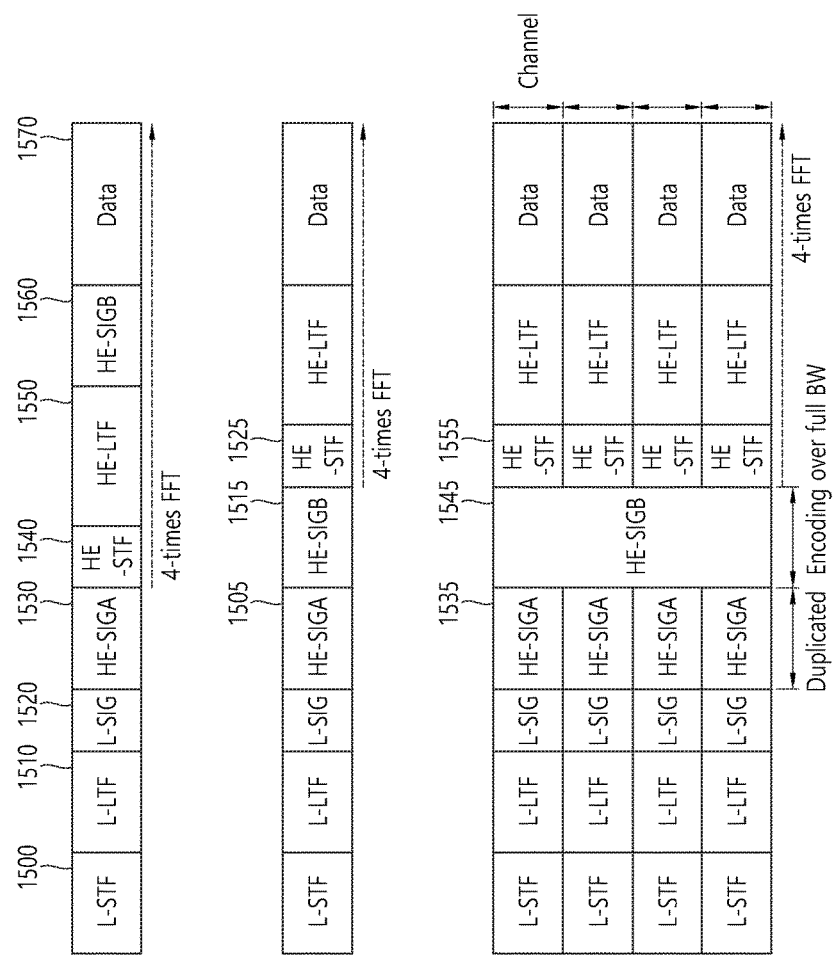
FIG. 15 is a conceptual view showing a PPDU format delivering a frame according to an exemplary embodiment of the present invention.

FIG. 15 is a conceptual view showing a PPDU format delivering a frame according to an exemplary embodiment of the present invention.

FIG. 15 discloses a PPDU format according to an exemplary embodiment of the present invention. The PPDU may include a PPDU header and a MAC protocol data unit (MPDU) (or physical layer service data unit (PSDU)). A frame may correspond to an MPDU. The PPDU of the PPDU format may be used in a sense of including PHY header and PHY preamble of the PPDU.

The PPDU format shown in FIG. 15 may be used to deliver the above-described frame (e.g., ADDTS request frame, ADDTS response frame, beacon frame, downlink frame for live video streaming service, operation mode request frame, operation mode response frame, and so on).

Referring to the upper part of FIG. 15, a PPDU header of a downlink PPDU may include a legacy-short training field (L-STF), a legacy-long training field (L-LTF), a legacy-signal (L-SIG), a high efficiency-signal A (HE-SIG A), a high efficiency-short training field (HE-STF), a high efficiency-long training field (HE-LTF), and a high efficiency-signal B (HE-SIG B). The PPDU may be divided into a legacy part, which consists of a part starting from the PHY header to the L-SIG, and a high efficiency (HE) part, which consists of a part after the L-SIG.

The L-STF 1500 may include a short training short training orthogonal frequency division multiplexing (OFDM) symbol). The L-STF 1500 may be used for frame detection, automatic gain control (AGC), diversity detection, and coarse frequency/time synchronization.

The L-LTF 1510 may include a long training OFDM symbol (long training orthogonal frequency division multiplexing symbol). The L-LTF 1510 may be used for fine frequency/time synchronization and channel prediction.

The L-SIG 1520 may be used for transmitting control information. The L-SIG 1520 may include information on data transmission rate, data length, and so on.

The HE-SIG A 1530 may include identification information of the STA for indicating a target STA that is to receive the downlink PPDU. The STA may decide whether or not to receive the PPDU based on an identifier information of the target STA by using the information included in the HE-SIG A 1530. In case the STA is indicated based on the HE-SIG A 1530 of the downlink PPDU, the STA may perform additional decoding on the downlink PPDU. Additionally, the HE-SIG A 1530 may also include information on resources (when performing transmission based on frequency resources (or subband) (orthogonal frequency division multiplexing (OFDMA))) or time-spatial stream resources (when performing transmission based on multiple input multiple output (MIMO)) that are to receive the downlink data.

Additionally, the HE-SIG A 1530 may also include color bits information for BSS identification information, bandwidth information, tail bit, CRC bit, modulation and coding scheme (MCS) information on the HE-SIG B 1560, information on the number of symbols for the HE-SIG B 1560, and cyclic prefix (CP) (or guard interval (GI)) length information.

The HE-SIG A 1530 may include information on the requested operation mode of the STA, information on the characteristics of the requested data of the STA, and information on the reception condition of the STA.

Additionally, the HE-SIG A 1530 may also include information on the operation mode of the STA, which is configured by the AP, and information on the characteristics of the transmission data being transmitted by the AP.

The HE-STF 1540 may be used for enhancing automatic gain control estimation in a MIMO environment or an OFDMA environment.

The HE-LTF 1550 may be used for estimating a channel in a MIMO environment or an OFDMA environment.

The HE-SIG B 1560 may include information on a length modulation and coding scheme (MCS) of a Physical layer service data unit (PSDU) for each STA and a tail bit, and so on.

The size of the inverse fast fourier transform (IFFT) being applied to the HE-STF 1540 and the field after the HE-STF 1540 may be different from the size of the IFFT being applied to the field before the HE-STF 1540. For example, the size of the IFFT being applied to the HE-STF 1540 and the field after the HE-STF 1540 may be four times larger than the size of the IFFT being applied to the field before the HE-STF 1540. In case the STA has received the downlink frame, the STA decodes the HE-SIG A 1530 of the downlink frame and may decide whether or not to decode the field after the HE-SIG A 1530 based on the identifier information of the target STA included in the HE-SIG A 1530. In this case, in case the identifier information of the target STA included in the HE-SIG A 1530 indicates the identifier of the STA, the STA may perform decoding based on the FFT size, which is changed starting from the HE-STF 1540 and the field after the HE-STF 1540. Conversely, in case the identifier information of the target STA included in the HE-SIG A 1530 does not indicate the identifier of the STA, the STA may stop the decoding process and may perform network allocation vector (NAV) configuration. A cyclic prefix (CP) of the HE-STF 1540 may have a size that is larger than the CP of other fields, and, during such CP period, the STA may change the FFT size and may perform decoding on the downlink PPDU.

The order of the fields configuring the format of the PPDU shown in the upper part of FIG. 15 may also be changed. For example, as shown in the middle part of FIG. 15, the HE-SIG B 1515 may be positioned immediately after the HE-SIG A 1505. The STA may perform decoding up to the HE-SIG A 1505 and the HE-SIG B 1515 and may receive the required control information and may then perform NAV configuration. Similarly, the IFFT size being applied to the HE-STF 1525 and the field after the HE-STF 1525 may be different from the IFFT size being applied to the field before the HE-STF 1525.

The STA may receive the HE-SIG A 1505 and the HE-SIG B 1515. In case the reception of the downlink PPDU is indicated by the identifier of the target STA of the HE-SIG A 1505, the STA may change the FFT size starting from the HE-STF 1525 and may then perform decoding on the downlink PPDU. Conversely, the STA may receive the HE-SIG A 1505, and, in case the reception of the downlink PPDU is not indicated based on the HE-SIG A 1505, the NAV configuration may be performed.

Referring to the lower part of FIG. 15, a downlink PPDU format for the downlink (DL) multi-user (MU) transmission is disclosed. The downlink PPDU may be transmitted to the STA through different downlink transmission resources (frequency resources or spatial streams) based on the OFDMA. More specifically, downlink data may be transmitted to multiple STAs through multiple subbands based on the downlink PPDU format for the DL MU transmission. Although it is not disclosed in the above-described exemplary embodiment, the AP may transmit downlink data to multiple STAs based on the DL MU downlink PPDU format.

Within the downlink PPDU, the fields before the HE-SIG B 1545 may each be transmitted from different downlink transmission resources in duplicated forms. The HE-SIG B 1545 may be transmitted in an encoded form over the entire transmission resources. The fields after the HE-SIG B 1545 may include individual information for each of the multiple STAs receiving the downlink PPDU.

In case each of the fields included in the downlink PPDU is transmitted through each downlink transmission resource, the CRC for each field may be included in the downlink PPDU. Conversely, in case a specific field included in the downlink PPDU is encoded and transmitted over the entire downlink transmission resource, the CRC for each field may not be included in the downlink PPDU. Therefore, the overhead for the CRC may be reduced. More specifically, the downlink PPDU format for the DL MU transmission according to the exemplary embodiment of the present invention may reduce the CRC overhead of the downlink frame by using an encoded form of the HE-SIG B 1545 within the entire transmission resource.

Similarly, in the downlink PPDU format for the DL MU transmission, the HE-STF 1555 and the field after the HE-STF 1555 may also be encoded based on an IFFT size that is different from the field before the HE-STF 1555. Therefore, in case the STA receives the HE-SIG A 1535 and the HE-SIG B 1545 and receives an indication on the reception of the downlink PPDU based on the HE-SIG A 1535, the STA may change the FFT size starting from the HE-STF 1555 and may then perform decoding on the downlink PPDU.

Figure 16:
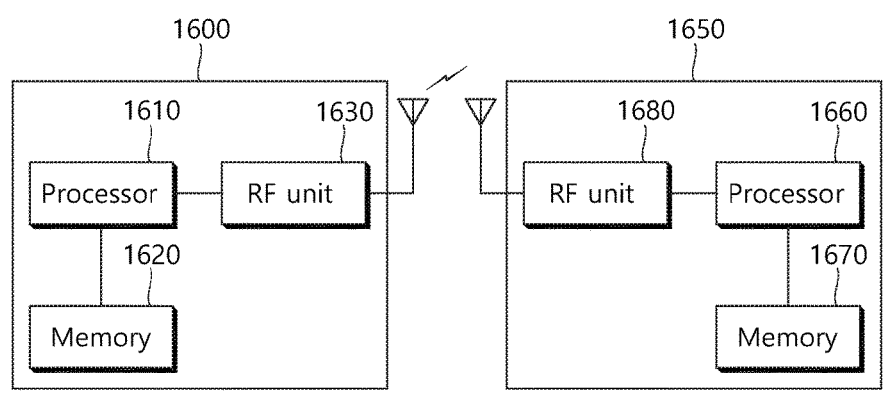
FIG. 16 is a block view showing a wireless device to which the exemplary embodiment of the present invention can be applied.

FIG. 16 is a block view showing a wireless device to which the exemplary embodiment of the present invention can be applied.

Referring to FIG. 16, as an STA that can realize the above-described exemplary embodiment, the wireless device 1600 may correspond to an AP 1600 or a non-AP STA 1650.

The AP 1600 includes a processor 1610, a memory 1620, and a radio frequency (RF) unit 1630.

The RF unit 1630 is connected to the processor 1610, thereby being capable of transmitting and/or receiving radio signals.

The processor 1610 implements the functions, processes, and/or methods proposed in the present invention. For example, the processor 1610 may be realized to perform the operations of the wireless device according to the above-described exemplary embodiments of the present invention. The processor may perform the operations of the wireless device, which are disclosed in the exemplary embodiments of FIG. 1 to FIG. 15.

For example, the processor 1610 may acquire network status information and may transmit operation mode configuration information for configuring the operation mode of the STA based on the network status information. The operation mode configuration information may include a power management bitmap.

Additionally, the processor 1610 may receive a configuration request of a TIM-based power save mode of the STA and may decide whether or not to authorize the configuration request of the TIM-based power save mode, thereby being capable of transmitting a response frame including information on whether or not to authorize operations based on the TIM-based power save mode.

The non-AP STA 1650 includes a processor 1660, a memory 1670, and a RF unit 1680.

The RF unit 1680 is connected to the processor 1660, thereby being capable of transmitting and/or receiving radio signals.

The processor 1660 implements the functions, processes, and/or methods proposed in the present invention. For example, the processor 1660 may be realized to perform the operations of the wireless device according to the above-described exemplary embodiments of the present invention. The processor may perform the operations of the wireless device, which are disclosed in the exemplary embodiments of FIG. 1 to FIG. 15.

For example, the processor 1660 may perform an initiation configuration procedure for configuring the TIM-based power save mode with the AP, and then the processor 1660 may operate in the TIM-based power save mode based on the initiation configuration procedure and may shift from the doze state to the awake state based on the transmission cycle of the beacon frame, thereby capable of receiving a first downlink frame of the AP. Additionally, the processor 1660 may be configured to receive operation mode configuration information, which indicates the shift from the TIM-based power save mode to the active mode, from the AP and to receive a second downlink frame from the AP based on the active mode. The first downlink frame and the second downlink frame may include data for live video streaming services, and the operation mode configuration information may be generated based on the network status information between the STA and the AP.

The operation mode configuration information may be transmitted based on the power management bitmap within the beacon frame, which is transmitted by the AP. Each of the multiple bits included in the power management bitmap may indicate whether to configure the operation mode of each of the multiple STAs including the STAs associated with the AP in the TIM-based power save mode or in the active mode, and each of the bits included in the power management bitmap corresponds to each of the multiple bits included in the TIM bitmap, and the TIM bitmap may indicate the presence or absence of pending downlink data for each of the multiple STAs.

The network status information may be acquired by the AP based on the ANQP, and the network status information includes the WAN metric information, and the WAN metric information may include information on a transmission rate of the data being transmitted through a channel between the AP and the STA and information on the load of the channel.

The processor 1610 and 1660 may include an application-specific integrated circuit (ASIC), another chip set, a logical circuit, a data processing device, and/or a converter converting a baseband signal and a radio signal to and from one another. The memory 1620 and 1670 may include a read-only memory (ROM), a random access memory (RAM), a flash memory, a memory card, a storage medium, and/or another storage device. The RF unit 1630 and 1680 may include one or more antennas transmitting and/or receiving radio signals.

When the exemplary embodiment is implemented as software, the above-described method may be implemented as a module (process, function, and so on) performing the above-described functions. The module may be stored in the memory 1620 and 1670 and may be executed by the processor 1610 and 1660. The memory 1620 and 1670 may be located inside or outside of the processor 1610 and 1660 and may be connected to the processor 1610 and 1660 through a diversity of well-known means.

What is claimed is:

1. An operation method based on a power save mode in a wireless LAN, comprising:

performing an initiation configuration procedure by a station (STA) for operating a traffic indication map (TIM)-based power save mode with an access point (AP);

determining whether or not to shift from the TIM-based power save mode to an active mode based on a TIM bitmap and a power management bitmap, wherein the TIM bitmap indicates a presence or absence of pending downlink data for each of multiple STAs including the STA, wherein the power management bitmap indicates an operation mode of STAs for which the TIM bitmap indicates a presence of pending downlink data, and wherein the power management bitmap is generated based on network congestion level between the STAs and the AP;

performing a shift from the TIM-based power save mode to the active mode if a power management bit included in the power management bitmap indicates 0, thereby receiving downlink data in an awake state of the TIM-based power save mode; and maintaining the TIM-based power save mode if the power management bit included in the power management bitmap indicates 1, thereby receiving downlink data in an awake state of the active mode, wherein the downlink data include data for live video streaming services, wherein the TIM bitmap and the power management bitmap are received through a beacon frame being transmitted by the AP, wherein the power management bitmap includes power management bits for each of the STAs for which the TIM bitmap indicates a presence of pending downlink data, and wherein each of the power management bits included in the power management bitmap corresponds to each of multiple bits included in the TIM bitmap.

2. The method of claim 1,
wherein the power management bit included in the power management bitmap indicates 0 when the network congestion level between the STA and the AP is greater than or equal to a predetermined threshold value, and
wherein the power management bit included in the power management bitmap indicates 1 when the network congestion level between the STA and the AP is less than the predetermined threshold value.

3. The method of claim 2, wherein information on the network congestion level is acquired based on an access network query protocol (ANQP),
wherein the information on the network congestion level includes wide area network (WAN) metric information,
wherein the WAN metric information includes information on a transmission rate of data being transmitted through a channel between the AP and the STA and information on a load of the channel.

4. A station (STA) being operated based on a power save mode in a wireless LAN, comprising:
a radio frequency (RF) unit configured to transmit or receive radio signals; and
a processor being operatively connected to the RF unit,
wherein the processor is configured to:
perform an initiation configuration procedure for operating a traffic indication map (TIM)-based power save mode with an access point (AP);
determine whether or not to shift from the TIM-based power save mode to an active mode based on a TIM bitmap and a power management bitmap,
wherein the TIM bitmap indicates a presence or absence of pending downlink data for each of multiple STAs including the STA,
wherein the power management bitmap indicates an operation mode of STAs for which the TIM bitmap indicates a presence of pending downlink data, and
wherein the power management bitmap is generated based on network congestion level between the STAs and the AP;

perform a shift from the TIM-based power save mode to the active mode if a power management bit included in the power management bitmap indicates 0, thereby to receive downlink data in an awake state of the TIM-based power save mode; and
maintain the TIM-based power save mode if the power management bit included in the power management bitmap indicates 1, thereby to receive downlink data in an awake state of the active mode,
wherein the downlink data include data for live video streaming services,
wherein the TIM bitmap and the power management bitmap are received through a beacon frame being transmitted by the AP,
wherein the power management bitmap includes power management bits for each of the STAs for which the TIM bitmap indicates a presence of pending downlink data, and
wherein each of the power management bits included in the power management bitmap corresponds to each of multiple bits included in the TIM bitmap.

5. The STA of claim 4,
wherein the power management bit included in the power management bitmap indicates 0 when the network congestion level between the STA and the AP is greater or equal to a predetermined threshold value, and
wherein the power management bit included in the power management bitmap indicates 1 when the network congestion level between the STA and the AP is less than the predetermined threshold value.

6. The STA of claim 5, wherein information on the network congestion level is acquired based on an access network query protocol (ANQP),
wherein the information on the network congestion level includes wide area network (WAN) metric information,
wherein the WAN metric information includes information on a transmission rate of data being transmitted through a channel between the AP and the STA and information on a load of the channel.

* * * * *